(Specimens.)
J. COLQUHOUN.
PROCESS OF DISINTEGRATING SLAG.
No. 443,898. Patented Dec. 30, 1890.
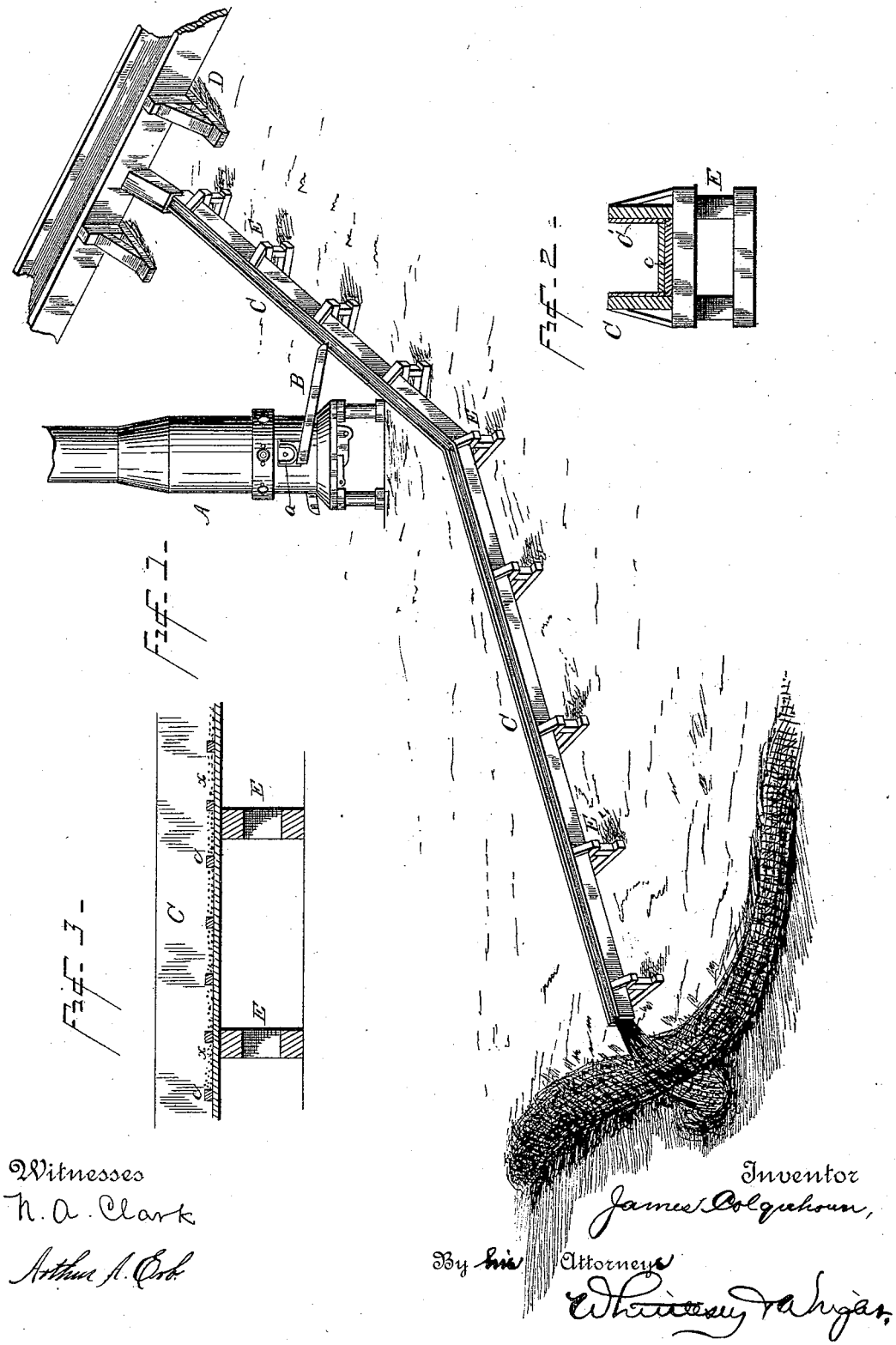
Witnesses
N. A. Clark
Arthur J. Orb
Inventor
James Colquhoun,
By his Attorneys

UNITED STATES PATENT OFFICE.

JAMES COLQUHOUN, OF CLIFTON, ARIZONA TERRITORY.

PROCESS OF DISINTEGRATING SLAG.

SPECIFICATION forming part of Letters Patent No. 443,898, dated December 30, 1890.

Application filed July 27, 1889. Serial No. 318,914. (Specimens.)

*To all whom it may concern:*

Be it known that I, JAMES COLQUHOUN, a citizen of the United States, residing at Clifton, in the county of Graham and Territory of Arizona, have invented certain new and useful Improvements in Processes of Disintegrating Slag; and I do declare the following to be a full, clear, and exact description of the invention, such as will enable others skilled in the art to which it appertains to make and use the same, reference being had to the accompanying drawings, and to the letters of reference marked thereon, which form a part of this specification.

My invention relates to the treatment of slag for the purpose of disintegrating it, recovering from it mechanically the particles of metal or mattes contained in it and carrying the waste slag to the slag-dump.

In many localities it is a matter of great importance to find some method of economically disposing of the slag from blast or other furnaces, the circumstances and conditions often being such that considerable expense is incurred in transporting the slag to a sufficient distance to prevent it from accumulating around the furnace in embarrassing quantities. In order to render it convenient to handle, it is necessary to break it up, which, if it is allowed to cool in large masses, becomes a laborious and expensive matter. It has been proposed to reduce the slag to small lumps by immersing it while hot in tanks of cold water, whereby it is cracked and disintegrated to a certain extent, so that it can be more easily handled. Slag has also been disintegrated by subjecting it while in a molten state to the action of a powerful jet of steam or water or air; but in all these methods more or less expensive machinery is necessary to lower the slag into the tanks, to clean out the lumps of disintegrated slag and carry them away, to drive the pumps for producing the jets of water or air, or to generate the steam. If water is conveyed under pressure from a head sufficient to give a jet the required force, strong and costly pipes must be laid and kept in repair.

My improvements dispense with all expensive apparatus and effect a better granulation of the slag, besides saving the metals and mattes that may be carried over from the furnace.

It consists in running the molten slag into a stream of water flowing rapidly through a sluice or launder, the stream being of sufficient volume to carry along with it the lumps of slag, which are thereby dashed against each other and against the sides and bottom of the launder and rapidly reduced to powder, the metals and mattes being caught in riffles in the bottom of the launder and the waste slag delivered with the water at the slag-dump. I have used this method with entire success in the treatment of copper slag.

The drawings show, in Figure 1, a furnace arranged to discharge its slag into a water-launder adapted to carry it to the slag-dump. Fig. 2 is a cross-section of the water-launder, and Fig. 3 is a longitudinal section of a portion thereof.

The furnace A is provided with a tap $a$, through which the slag can be drawn out into a trough B, suitably inclined to carry it off. A launder C is arranged beneath the delivery end of the trough B, extending from near the main water flume or sluice D to the point where the waste slag is to be deposited. The launder is preferably composed of wood, and may, if desired, be lined with sheet metal C' to protect it from wear and tear. It is preferably about one foot square in cross-section and may be supported on timber frames E or in any convenient manner. Across the bottom are fastened riffles $c$, preferably about one foot apart.

The launder is fed with water from the main sluice and has a sufficient fall to give the water a high velocity. A fall of one-half an inch to the foot has been found to give a great enough velocity to carry off all the slag, and yet permit the riffles to catch the metal and mattes released from the slag during the process of granulation.

The operation is as follows: The launder being filled with a rapidly-flowing stream of water, the slag-tap is opened and the molten slag allowed to flow into the water, its amount being regulated as experience may direct to secure the best results. Upon entering the water it instantly congeals into lumps, which are dashed along by the force of the water, hurled against each other and against the sides and bottom of the launder, and quickly become reduced to powder under the disintegrating action of the cold water and the agitation. The particles of metal or matte mechanically held in the slag are set free and sink to the bottom of the launder, where they are caught by the riffles. Some of the granulated slag lodges with the metal and mattes and forms a shallow bed $x$ of hard material, which protects the bottom of the launder from being worn out by the sharp edges of the lumps of slag. The waste granulated slag is rapidly swept along by the water, which is of sufficient volume to carry it readily, and the mingled water and slag-powder are finally emptied at the slag-dump. It is evident that this may be at a considerable distance from the furnace, and it may in some cases be practicable to discharge the slag and water directly into a river, where it will be carried off by the current.

The advantages of my method of treating slag have been intimated above, and they will be readily appreciated by those familiar with practical metallurgy.

Having thus described my invention, what I claim, and desire to secure by Letters Patent, is—

The method of granulating slag and recovering the metal and mattes mechanically held therein, which consists in running the molten slag into a stream of water of sufficient volume and velocity to sweep away the lumps of congealed slag and dash them together forcibly enough to reduce them to powder, and then catching the metals and matte set free from the slag, said stream being of sufficient length and proper fall to permit the metals and mattes to settle to the bottom of the stream and be caught by suitable devices, while the waste slag is carried away to the dump, substantially as described.

In testimony whereof I affix my signature in presence of two witnesses.

JAMES COLQUHOUN.

Witnesses:
   J. G. HOPKINS,
   O. F. BALDWIN.